(12) United States Patent
Otsubo et al.

(10) Patent No.: US 7,995,522 B2
(45) Date of Patent: Aug. 9, 2011

(54) BASE STATION AND PACKET TRANSFER EQUIPMENT

(75) Inventors: Shuji Otsubo, Yokohama (JP); Tomoya Yokota, Fujisawa (JP); Kingo Miyoshi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 758 days.

(21) Appl. No.: 12/107,964

(22) Filed: Apr. 23, 2008

(65) Prior Publication Data

US 2009/0016267 A1    Jan. 15, 2009

(30) Foreign Application Priority Data

Jul. 13, 2007    (JP) .................................. 2007-184166

(51) Int. Cl.
*H04W 4/00* (2009.01)
*H04W 92/12* (2009.01)
(52) U.S. Cl. ........................................ 370/328; 370/542
(58) Field of Classification Search .................. None
See application file for complete search history.

(56) References Cited

U.S. PATENT DOCUMENTS

| | | | | |
|---|---|---|---|---|
| 6,160,808 A | * | 12/2000 | Maurya | 370/389 |
| 6,577,596 B1 | * | 6/2003 | Olsson et al. | 370/230 |
| 6,577,644 B1 | * | 6/2003 | Chuah et al. | 370/466 |
| 6,775,305 B1 | * | 8/2004 | Delvaux | 370/535 |
| 7,787,418 B2 | * | 8/2010 | Chou | 370/329 |
| 2006/0182152 A1 | * | 8/2006 | Bi et al. | 370/542 |

FOREIGN PATENT DOCUMENTS

| | | |
|---|---|---|
| JP | 2004-056336 | 2/2004 |
| JP | 2006-270476 | 10/2006 |

\* cited by examiner

*Primary Examiner* — Min Jung
(74) *Attorney, Agent, or Firm* — Antonelli, Terry, Stout & Kraus, LLP.

(57) ABSTRACT

A base station and a router are interactively connected by a multilink group which transmits VoIP packets and a multilink group which transmits data packets other than VoIP packets. The base station and the router split transmission lines by referencing the ToS area of received packets and transmit only VoIP packets by way of a dedicated line. In this way, VoIP packets can be transmitted without being affected by other data packets, and the quality of VoIP can be warranted on the mobile network.

4 Claims, 11 Drawing Sheets

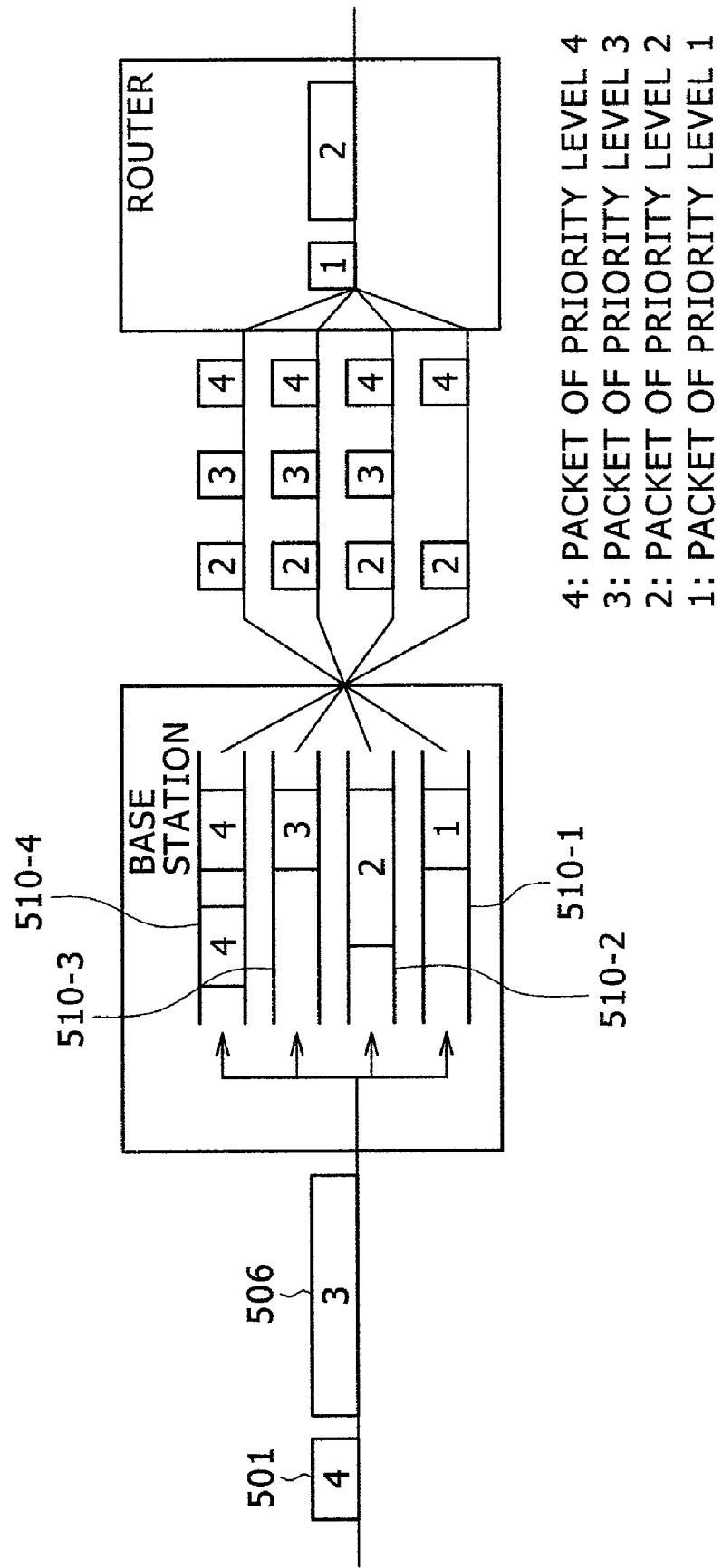

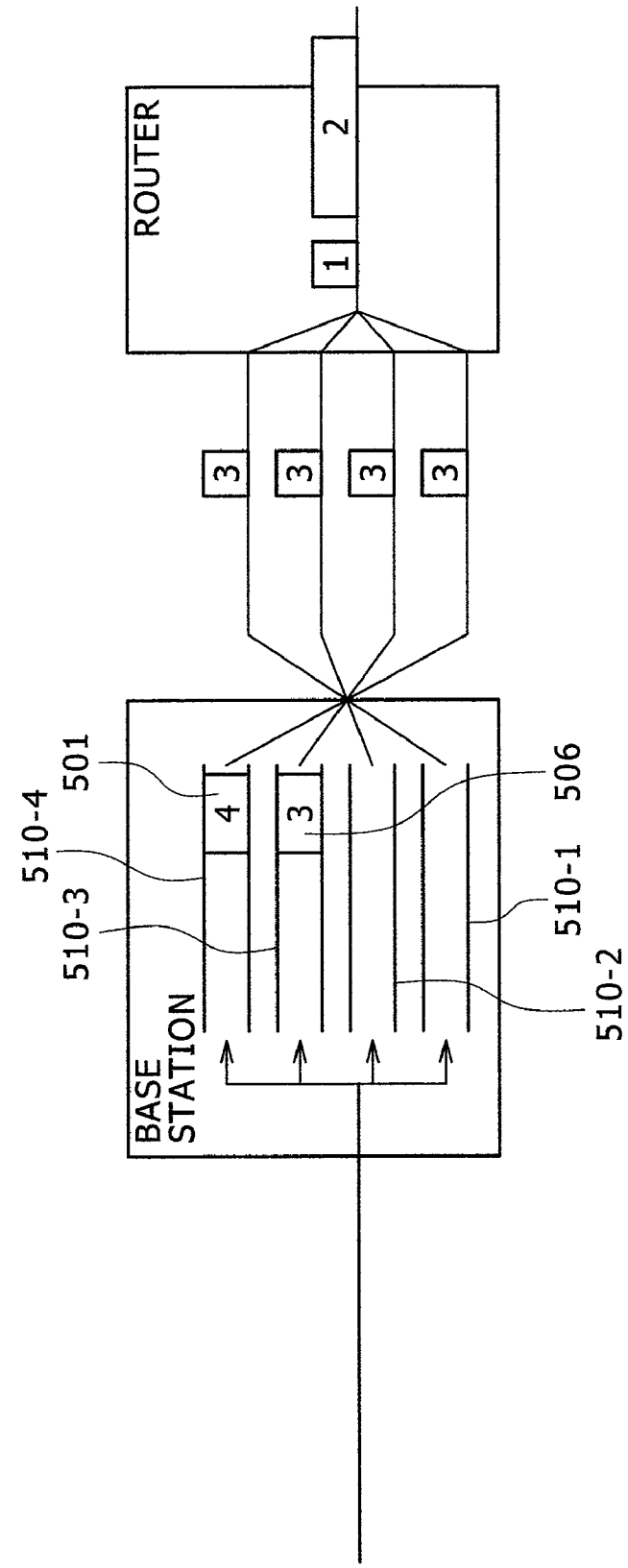

BASE STATION AND PACKET TRANSFER EQUIPMENT

CLAIM OF PRIORITY

The present application claims priority from Japanese patent application serial no. 2007-184166, filed on Jul. 13, 2007, the content of which is hereby incorporated by reference into this application.

BACKGROUND OF THE INVENTION

The present invention relates to a base station and packet transfer equipment in a mobile network utilizing T1 leased lines using multilink PPP as the backhaul lines of a mobile telephone base station.

A mobile network usually uses T1 leased lines multilinked to backhaul lines from the base station accessed by mobile terminals to an IP network. Since T1 leased lines are laid in a broad range, they are suitable for base stations of mobile communication. Channels are multiplexed by multilinking T1 leased lines to enhance the data transmission speed. Base stations connected to a router by T1 lines to which multilink PPP is applied and the router collectively managing the base stations will be described with reference to FIG. 1. FIG. 1 is a block diagram of a mobile network. In FIG. 1, a mobile network 100 includes a mobile terminal 10, two base stations 20 and a router 30 collectively managing the base stations 20. Each of the base stations 20 has a data transceiving unit 21 which exchanges data with the mobile terminal 10 and a backhaul line interface 22 which exchanges data with the router 30. The router 30 has a line interface 31 connected to backhaul line interfaces 22 of the base station 20 and to an IP data network 40.

T1 lines 50 to which multilink PPP connecting the base stations 20 with the router 30 is applied secure broadband communication paths by collectively managing data communication paths of lines set in the same multilink group into a logically single line.

The method of packet transmission using multilink PPP (MP) between a base station and the router will be described below with reference to FIG. 2. FIG. 2 here is a diagram illustrating the method of packet transmission using multilink PPP between the base station and the router. Referring to FIG. 2, the base station 20, when it receives a packet at its IP unit 23 from a terminal, fragments the IP packet in its MP unit 24 according to the band-pass situation of each link, and allocates the fragments to lines 51 constituting the multilink for transmission. At the router 30 on the receiving side, an MP unit 34 reassembles the fragments to reconstruct the IP packet, which is transmitted from an IP unit 33 to an IP data network.

Multilink encapsulation and overhead will be described now with reference to FIG. 3. Here, FIG. 3 is a diagram illustrating multilink encapsulation and overhead. Referring to FIG. 3, the base station splits an IP packet 60 into fragment 1 through fragment 4. Each of the resultant fragments, to which one-byte flags 61 at the leading and trailing edges, a usual PPP header 62, an MP header 63 having information for order control and a frame check sequence (FCS) 64 are added, is sent to each PPP link. The overhead size increment due to multilink encapsulation is 12 bytes×the number of links.

The mobile network is divided into data communication lines and voice communication lines. The data line network, architected mainly for use by e-mail, is unsuitable for applications which require real time links, such as voice communication.

In a fixed communication network, on the other hand, VoIP is realized also for voice communication by dedicated hardware such as IP telephone sets. Although VoIP using dedicated hardware uses the same lines as data communication by personal computers and the like, speech quality is warranted by subjecting VoIP packets to prioritized control. In a fixed communication network, VoIP can be more easily realized because a broader band is provided than for a mobile network.

Methods of prioritized control of VoIP packets include packet prioritizing control by setting a type of service (ToS) value of the IP header. The ToS area of the IP header will be described with reference to FIG. 4. FIG. 4 here shows the format of the IP header. Referring to FIG. 4, an IP header 400 includes a version 401, a header length 402, a ToS 403, a datagram length 404, an identification number 405, a flag 406, a fragment offset 407, a time to live (TTL) 408, a protocol number 409, a check sum 410, a source IP address 411 and a destination IP address 412. The ToS 403 consists of eight bits, of which the leading three bits denote the level of priority.

The dedicated VoIP hardware sets the ToS value high and transmits it to a host unit. The host unit references the ToS value of the packet and performs prioritized control accordingly. The host unit stores received packets into transmit queues according to the ToS value. Packet transmission from the queues is accomplished in a prioritized manner in the descending order of the ToS value. If any data remains in a queue of high priority, no data will be transmitted from queues lower in priority.

JP-A-2004-056336 discloses a VoIP system which realizes seamless handover with little delay between mobile terminals and a base station.

Conventionally, a mobile network uses separate channels for data communication and speech communication. In recent years, the possibility of introducing a VoIP service in a mobile network which realizes speech communication by data communication has been contemplated.

However, the data delay time permissible in a mobile network is far shorter than in data communication, and accordingly it is difficult to warrant the quality of VoIP between existing data communication devices. For this reason, it is necessary to enhance the quality of VoIP packets between mobile network devices.

As a way to warrant the quality of VoIP packets, the packets can be placed under prioritized control. In accomplishing prioritized control of packets, the ToS value of the IP header is set on the transmitting side, and the packet transmitting device of the receiving host unit references ToS values and transmits packets in the descending order of the set ToS value. In the mobile network described with reference to FIG. 1 as well, if prioritized control of packets is used, the quality of VoIP can be warranted by assigning levels of priority at the terminal to packets to be transmitted to the base station and transmitting on the base station side packets to a router which gives top priority to VoIP packets. However, since the packet data channel of the mobile network is not sufficient in bandwidth and moreover uses the same line as other sets of data, if the line is congested with non-VoIP packets or the output interface is congested, the VoIP packets may be delayed, resulting in a failure to obtain sufficient quality assurance.

A case in which VoIP packets are delayed in the mobile network shown in FIG. 1 even when packets are subjected to prioritized control will be described with reference to FIGS. 5A to 5C. FIGS. 5A to 5C here are diagrams illustrating how VoIP packets are delayed even when packets are subjected to prioritized control. Referring to FIG. 5A, for packets 501 and 506 transmitted from terminals, packet priority levels are set at mobile terminals in the ToS areas of their respective IP headers. Here, the priority level of VoIP packets is set to 4. Numerals "4", "3", "2" and "1" in FIG. 5 (and FIG. 10 to be referenced afterwards) represent priority levels, the relationship among which is 4>3>2>1.

Having received packets, the base station queues the packets in accordance with the set levels of priority. A queue 510-4 is the queue of the highest priority level, a queue 510-3 is the queue of the second highest priority level, a queue 510-2 is the queue of the third highest priority level, and a queue 510-1 is the queue of the lowest priority level. The packets are transmitted to the router in the descending order of the priority level, and a packet higher in priority level is transmitted to the router with a less delay. However, supposing a case in which the packet 506 of a large size and "3" in priority level is queued in a state in which no packet is in the queue 510-4 for VoIP as shown in FIG. 5B, the VoIP packet 501 will not be transmitted until the transmission of the large size packet 506 is fully completed even if the VoIP packet 501 is queued afterwards as shown in FIG. 5C. As a result, transmission of the VoIP packet is delayed even if prioritized control of packets is performed.

SUMMARY OF THE INVENTION

In order to address this problem, the invention is intended to enable VoIP packets to be transmitted to the router with priority without being affected by other non-VoIP packets and cause the quality assurance and the transmission efficiency of VoIP in a mobile network to be enhanced.

The problem noted above can be addressed with a base station connected to plural mobile terminals and packet transfer equipment, wherein the base station, when data packets are received from the plural mobile terminals, splits the same into VoIP packets and non-VoIP packets on the basis of the priority levels of the data packets, and transmits the VoIP packets from a first T1 line to which multilink PPP is applied to the packet transfer equipment and the non-VoIP packets from a second T1 line to which multilink PPP is applied to the packet transfer equipment.

The problem can also be addressed with packet transfer equipment which, connected to a base station, transfers data packets received from a network to the base station, wherein the packet transfer equipment, when data packets are received from the network, splits the same into VoIP packets and non-VoIP packets on the basis of the priority levels of the data packets, and transmits the VoIP packets from a first T1 line to which multilink PPP is applied to the base station and the non-VoIP packet packets from a second T1 line to which multilink PPP is applied to the base station.

BRIEF DESCRIPTION OF THE DRAWINGS

Preferred embodiments of the present invention will now be described in conjunction with the accompanying drawings, in which:

FIG. 5A illustrates how VoIP packets are delayed even when packets are subjected to prioritized control packet (part 1);

FIG. 5C illustrates how VoIP packets are delayed even when packets are subjected to prioritized control packet (part 3);

DESCRIPTION OF THE PREFERRED EMBODIMENTS

Figure 1:
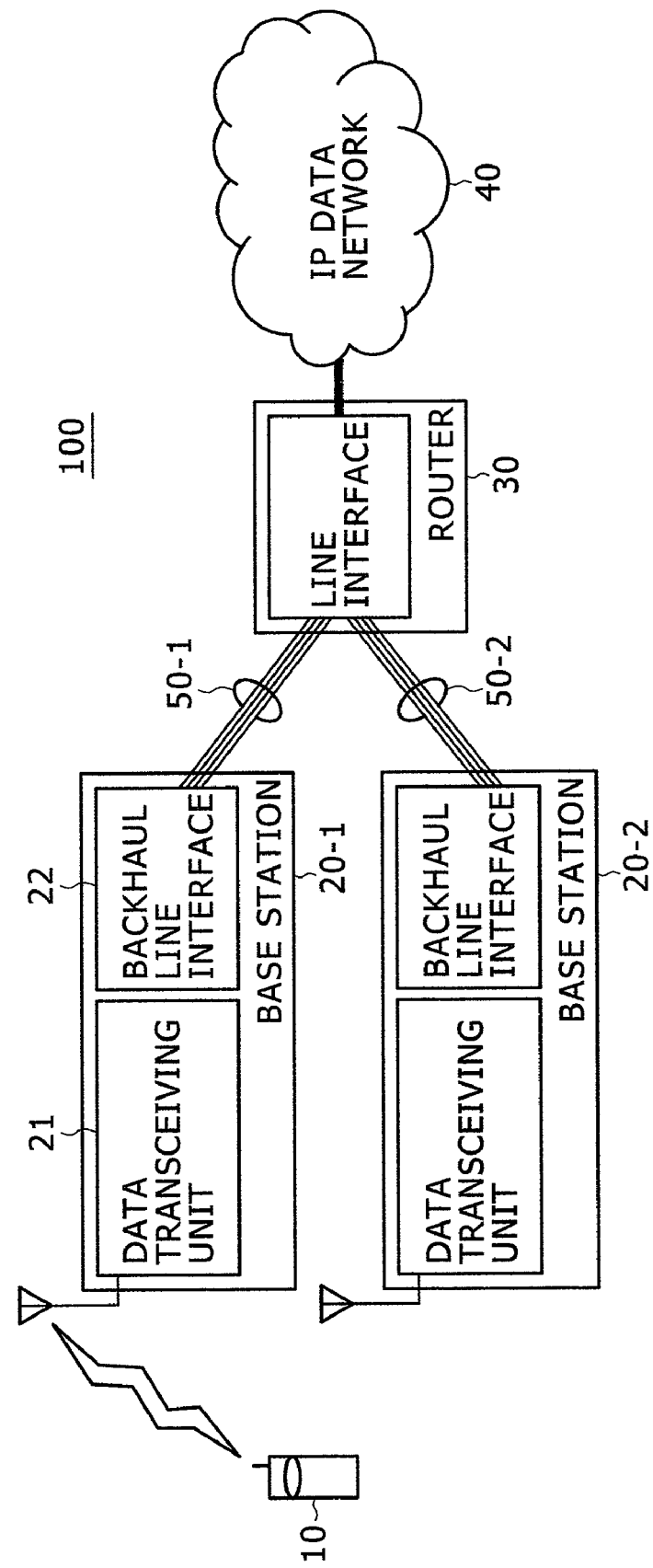
FIG. 1 is a block diagram of a mobile network.
Figure 2:
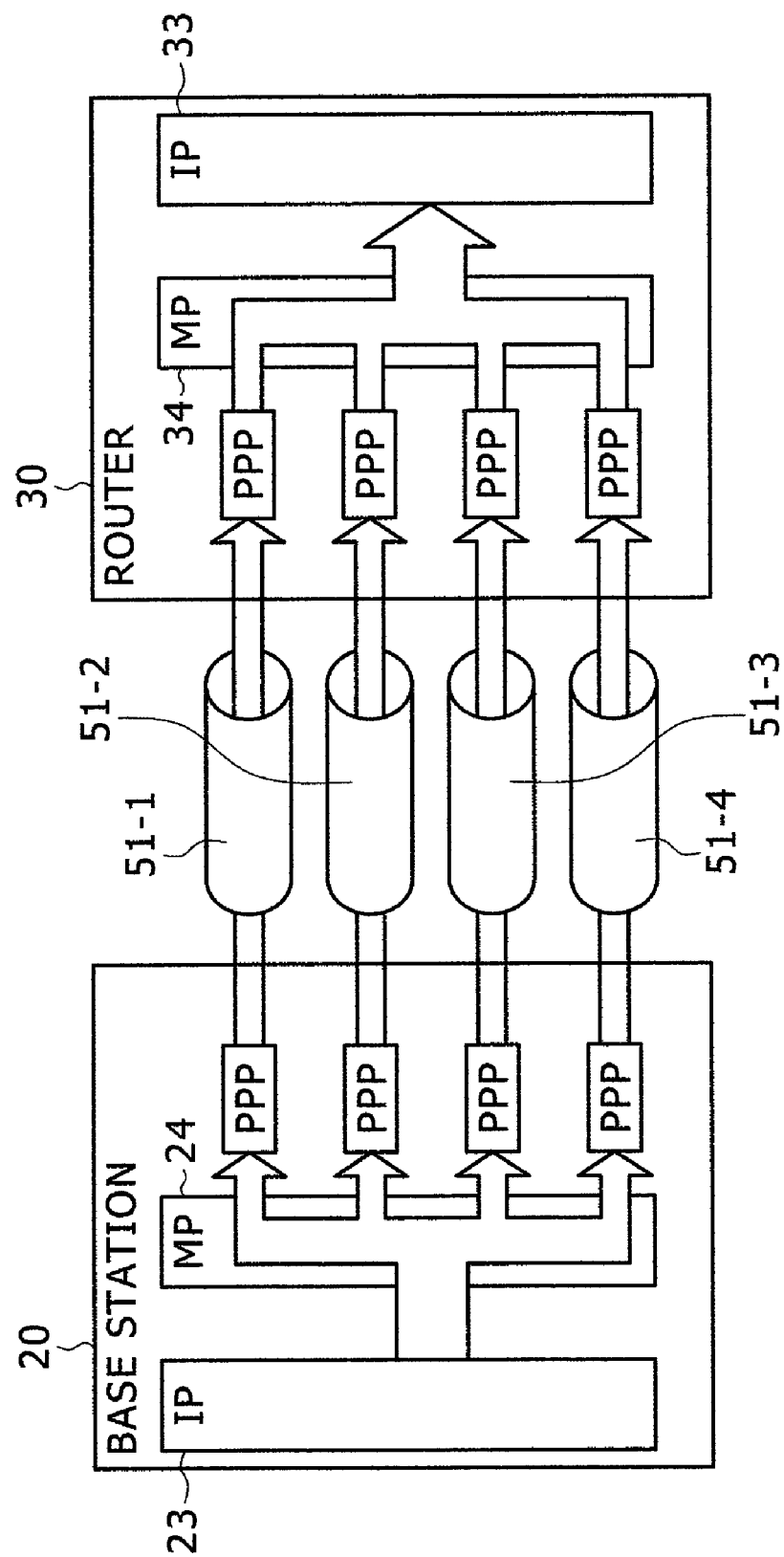
FIG. 2 is a diagram illustrating connection between a base station and a router.
Figure 3:
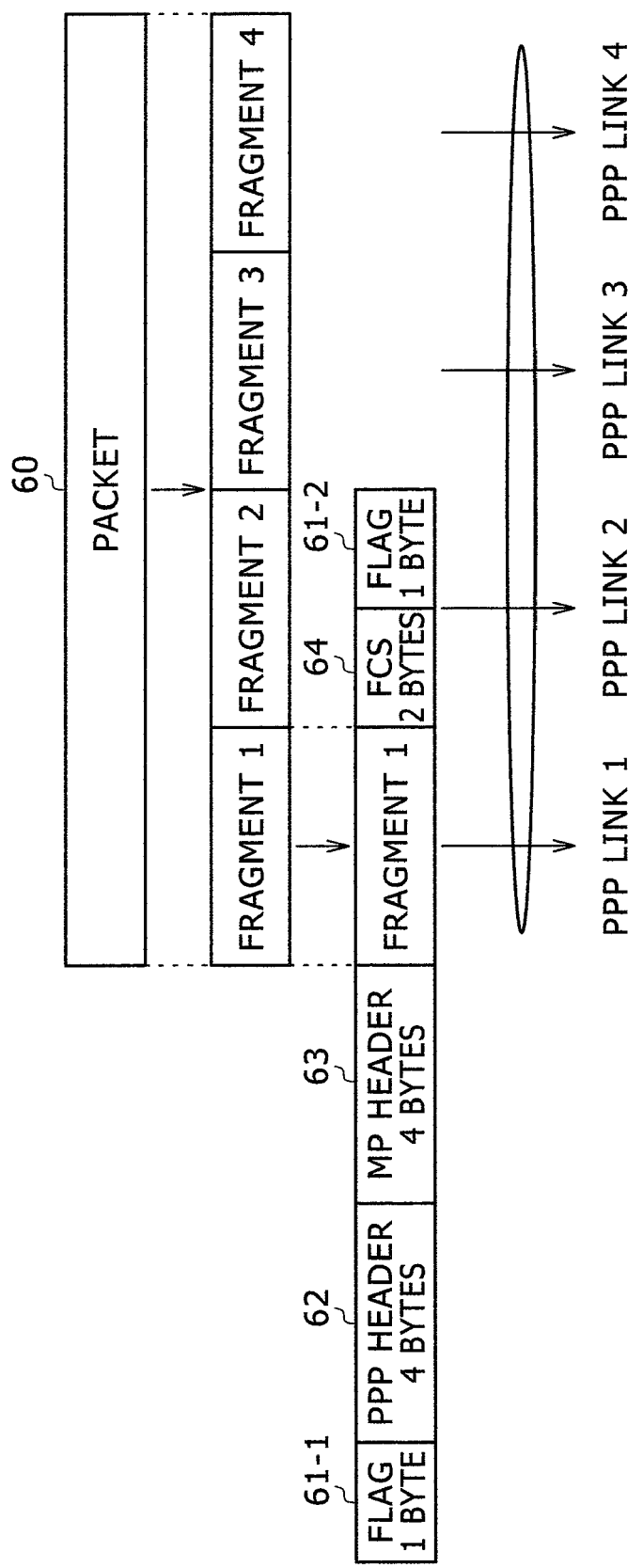
FIG. 3 is a diagram illustrating multilink encapsulation and overhead.
Figure 4:
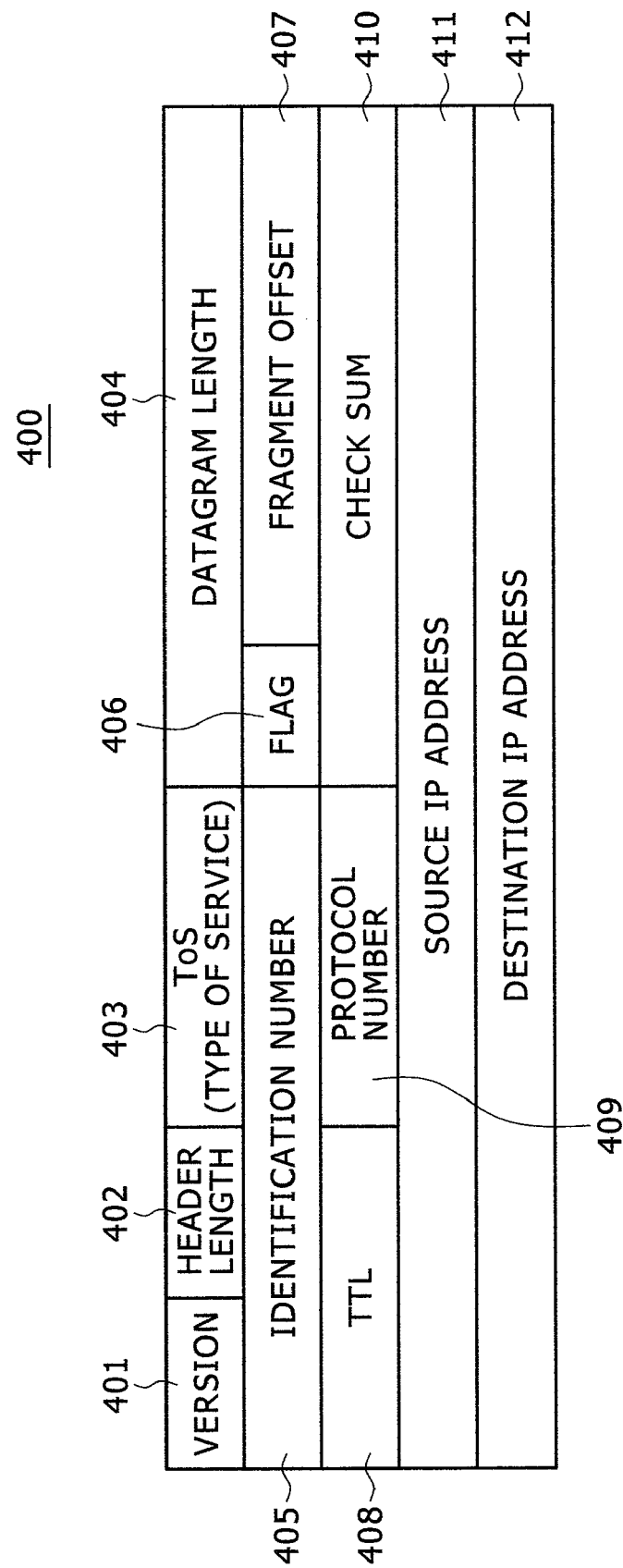
FIG. 4 shows the format of an IP header.
Figure 5B:
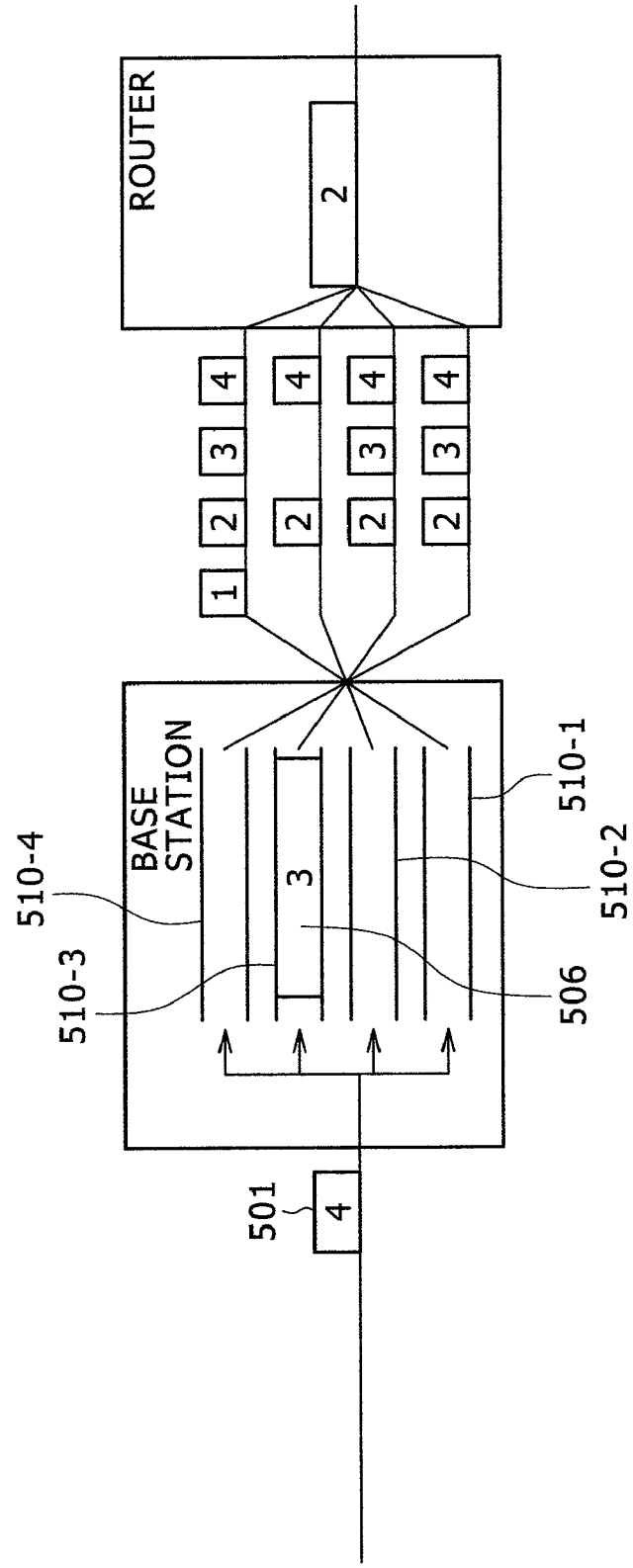
FIG. 5B illustrates how VoIP packets are delayed even when packets are subjected to prioritized control packet (part 2)

Examples will be described below with reference to a preferred embodiment thereof and accompanying drawings. Substantially the same elements are assigned respectively the same reference numerals, and their description will not be duplicated.

Figure 6:
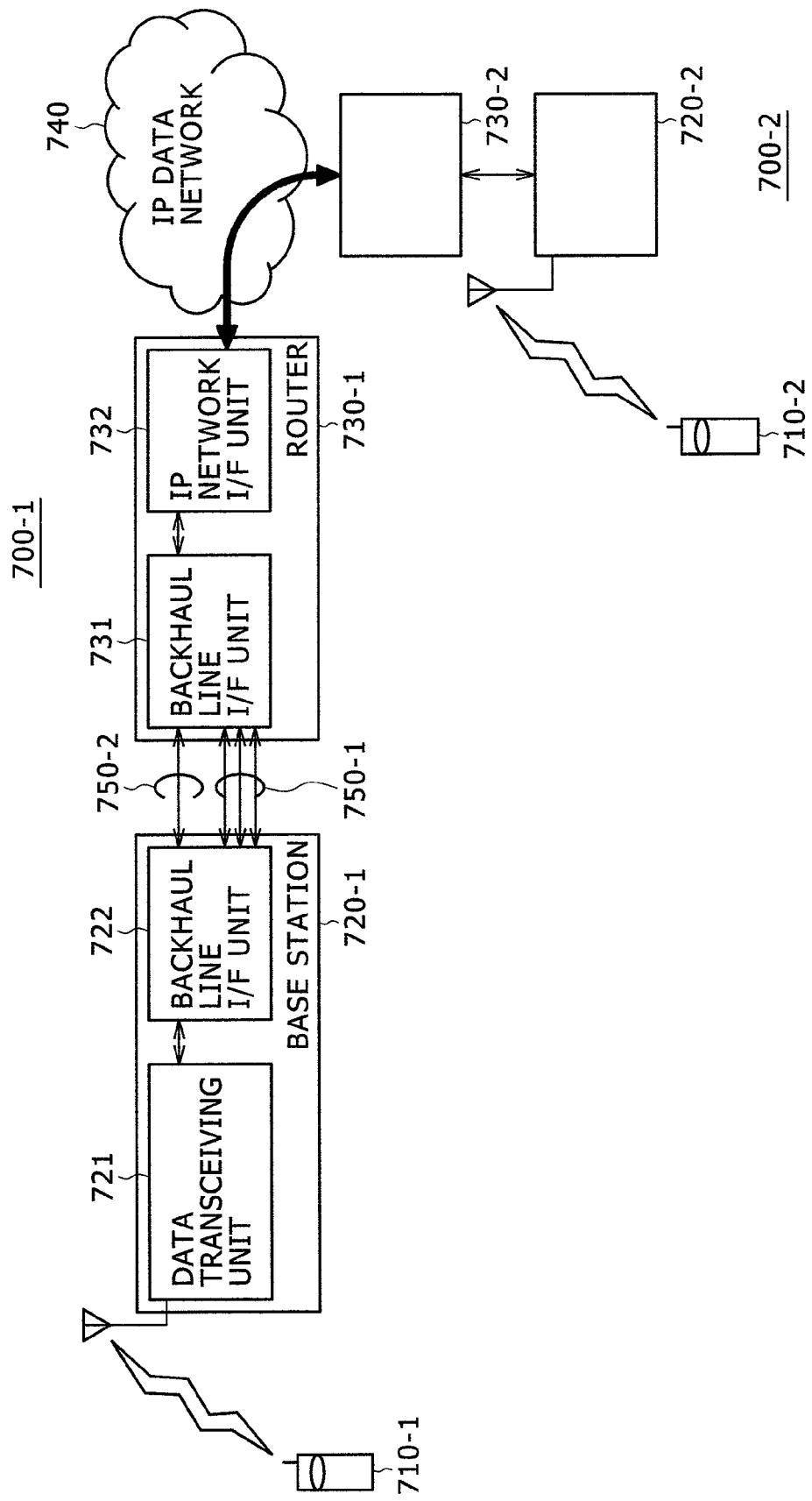
FIG. 6 is a block diagram of a mobile network and an IP data network.

A mobile network dedicated to data transmission will be described with reference to FIG. 6. Here, FIG. 6 is a block diagram of a mobile network and an IP data network. Referring to FIG. 6, in a mobile network 700, two mobile terminals 710-1 and 710-2 are connected via a base station 720-1, a router 730-1, a router 730-2 and a base station 720-2. The router 730-1 and the router 730-2 are connected via an IP data network 740. The base stations 720 and the routers 730 are connected by a multilink group 750-2 which transmits only VoIP packets and a multilink group 750-1 which transmits non-VoIP packets. Although the base station 720-2 and the router 730-2 are shown to be linked by a single line for the convenience of illustration, they are connected by two multilink groups as are the base station 720-1 and the router 730-1. While the T1 lines constituting the multilink grouping is supposed to include three multilink groups 750-1 and one multilink group 750-2, this composition are dynamically varied depending on the relative congestion of VoIP packets. The constitution of the multilink group 750-2 of only one T1 line here results from the consideration that, if a multilink group were formed after congestion occurs on a VoIP line, setting would take time and invite a delay in the transmitted packets.

Incidentally, though a configuration in which the base stations 720 and the routers 730 are connected in one-to-one correspondence is shown in FIG. 6, actually each of the routers 730 ties up plural base stations 720.

The base station 720-1 includes a data transceiving unit 721 which transmits and receives data to and from the mobile terminal 710-1 and a backhaul line I/F unit 722 which transmits and receives data to and from the router 730-1. The router 730-1 includes a backhaul line I/F unit 731 which transmits and receives data to and from the base station 720-1 and an IP network I/F unit 732 which transmits and receives data to and from the IP data network 740.

The mobile terminal 710-1 sets the priority level in the ToS area of the IP header of the packet to be transmitted and transmits the packet to the base station 720-1. The backhaul line I/F unit 722 of the base station 720-1 determines a transmit multilink group for and schedules (queues) of packets transferred from the data transceiving unit according to the priority level of each. More specifically, the backhaul line I/F unit 722, referencing the ToS of the IP header of the IP packet received from the mobile terminal 710-1, selects the multilink group 750-2 if the priority level is 4 (VoIP). Or if the priority level is not 4, the backhaul line I/F unit 722 selects the multilink group 750-1. The backhaul line I/F unit 722 dynamically sets plural multilink groups according to the traffic volume of VoIP. The backhaul line I/F unit 731 of the router 730-1, when packets are transmitted from the base stations 720, reconstructs the packet split by the multilink PPP.

The foregoing description of the operations of the backhaul line I/F units 722 and 731 concerned operations in the direction from the mobile terminal 710-1 to the router 730-1. When packets are received from the router 730-2 which is opposite with the IP data network 740 in-between, the operations of the backhaul line I/F units 722 and 731 are reversed.

Figure 7:
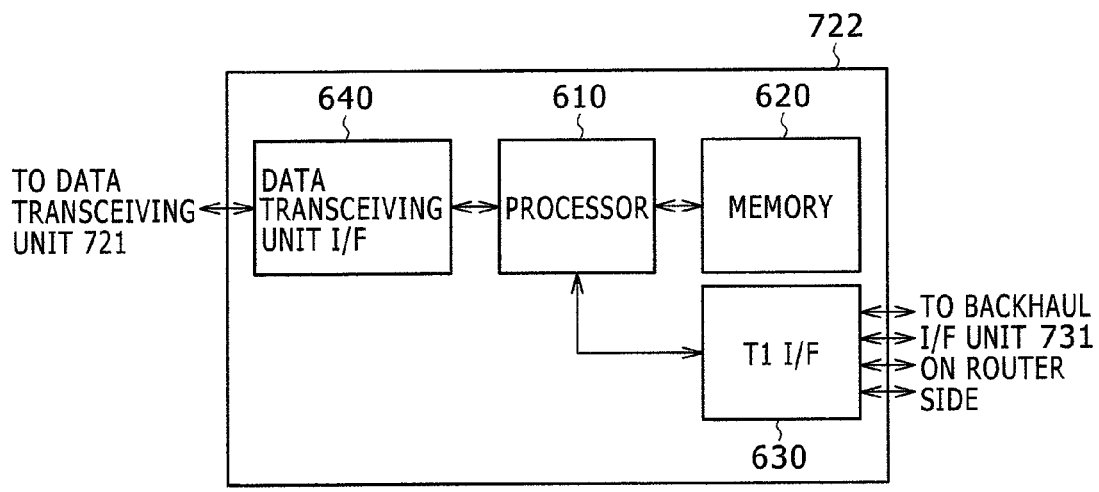
FIG. 7 is a hardware block diagram of the backhaul line I/F of a base station.
Figure 8:
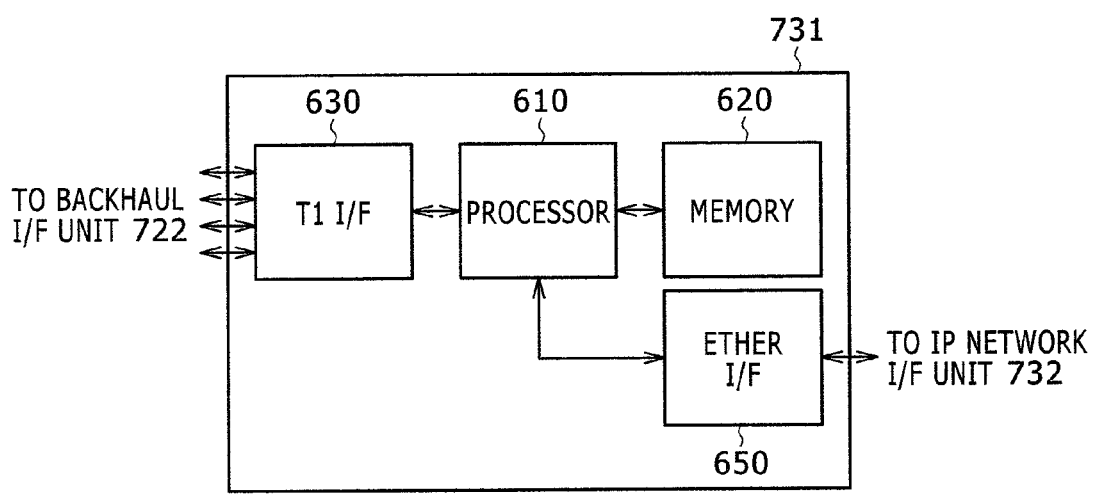
FIG. 8 is a hardware block diagram of the backhaul line I/F of a router.

Backhaul line I/Fs will now be described with reference to FIGS. 7 and 8. Here, FIG. 7 is a hardware block diagram of the backhaul line I/F of a base station. FIG. 8 is a hardware block diagram of the backhaul line I/F of a router.

Referring to FIG. 7, the backhaul line I/F unit 722 of a base station 720 includes a data transceiving unit I/F 640 connected to the data transceiving unit 721, a processor 610, a memory 620 and a T1 I/F 630 connected to the backhaul line I/F unit 731 of a router 730.

Referring to FIG. 8, the backhaul line I/F unit 731 of a router 730 includes a T1 I/F 630 connected to the backhaul line I/F unit 722 of a base station 720, a processor 610, a memory 620 and an ether I/F 650 connected to the IP network I/F unit 732.

Figure 9:
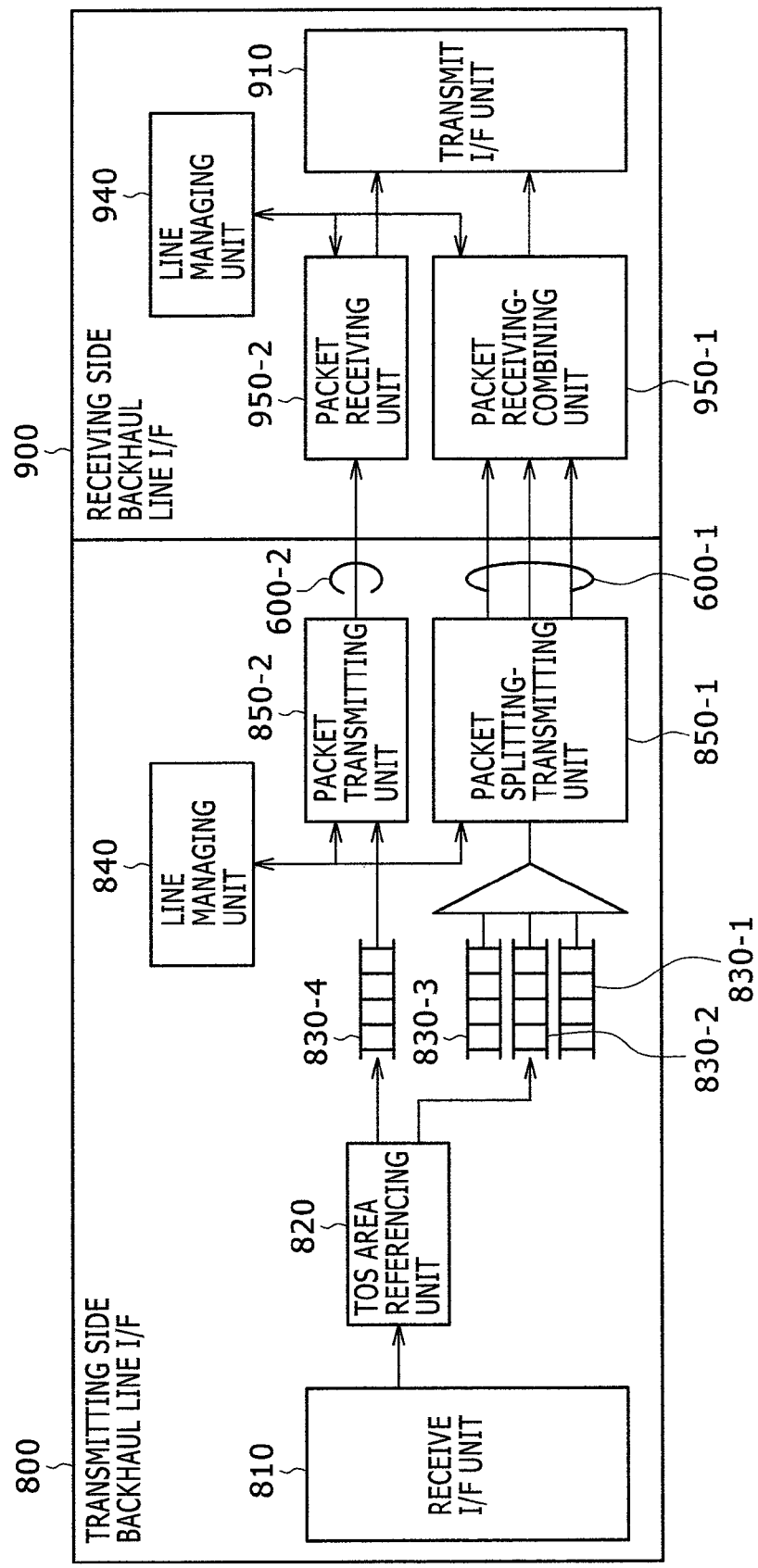
FIG. 9 is a functional block diagram of a backhaul line I/F.

Since the backhaul line I/F unit 722 of a base station 720 and the backhaul line I/F unit 731 of a router 730 are basically operated in the same way as stated at the end of the description referring to FIG. 6, the following description referring to FIG. 9 will separately focus on the transmitting side and the receiving side. Here, FIG. 9 is a functional block diagram of a backhaul line I/F unit.

Referring to FIG. 9, each of the backhaul line I/F units 722 and 731 includes a transmitting side backhaul line I/F 800 and a receiving side backhaul line I/F 900. Incidentally, FIG. 9 illustrates the relationship of connection between the transmitting side backhaul line I/F 800 of the backhaul line I/F 722/731 and the receiving side backhaul line I/F 900 of the backhaul line I/F 731/722. The transmitting side backhaul line I/F 800 and the receiving side backhaul line I/F 900 are connected by a multilink group 600-2 and a multilink group 600-1. The multilink group 600-2 transmits and receives VoIP packets, and the multilink group 600-1 transmits and receives data packets other than VoIP packets.

The transmitting side backhaul line I/F 800 includes a receive I/F unit 810, a ToS area referencing unit 820, four queues 830, a line managing unit 840 and a packet transmitting unit (packet splitting-transmitting unit) 850.

The receiving side backhaul line I/F 900 includes a packet receiving unit (packet receiving-combining unit) 950, a line managing unit 940 and a transmit I/F unit 910.

When the receive I/F unit 810 of the transmitting side backhaul line I/F 800 receives a packet, the ToS area referencing unit 820 references the ToS area of reception, and transfers the packet to a queue 830 matching its priority level. Here, the queue 830-4 is where packets of "4" in priority level are to be arranged. The queue 830-3 is where packets of "3" in priority level are to be arranged. The queue 830-2 is where packets of "2" in priority level are to be arranged. The queue 830-1 is where packets of "1" in priority level are to be arranged.

VoIP packets arranged in the queue 830-4 are transmitted from the packet transmitting unit (packet splitting-transmitting unit) 850-2 by Multi-Link Point to-Point Protocol (MLPPP). Although only one T1 line is shown in FIG. 9, plural T1 lines can be used as well. The packet transmitting unit 850-2 then functions as a packet splitting-transmitting unit, equally splits a packet between two T1 lines and transmits the split packets. Packets arranged in the queues 830-3 through 830-1 are transmitted from the packet splitting-transmitting unit 850-1 according to the priority level.

The line managing unit 840 monitors the band of the packet transmitting unit (packet splitting-transmitting unit) 850-2 for VoIP packets and, if the remaining room in the band becomes tight, reorganizes multilink groups. Thus, the T1 lines constituting the multilink group for VoIP are moved from the multilink group for non-VoIP. The line managing unit 840 reorganizes multilink groups when, conversely, the remaining room in the band becomes ample when plural T1 lines constitute the multilink group for VoIP. Thus, one of the T1 lines constituting the multilink group for VoIP is moved to the multilink group for non-VoIP. The line managing unit 840 transmits line management information to the line managing unit 940 of the receiving side backhaul line I/F 900.

The packet receiving unit (packet receiving-combining unit) 950-2 of the receiving side backhaul line I/F 900 removes the capsule of the received multilink capsule, and transmits the decapsulated multilink packet to the transmit I/F unit 910. The packet receiving unit (packet receiving-combining unit) 950-1 removes the capsule of the received multilink capsule, assembles an IP packet, and transmits the IP packet to the transmit I/F unit 910.

The line managing unit 940 controls, on the basis of line information received from the line managing unit 840 of the transmitting side backhaul line I/F 800, the reorganization of the multilink groups of the packet receiving unit (packet receiving-combining unit) 950.

Figure 10:
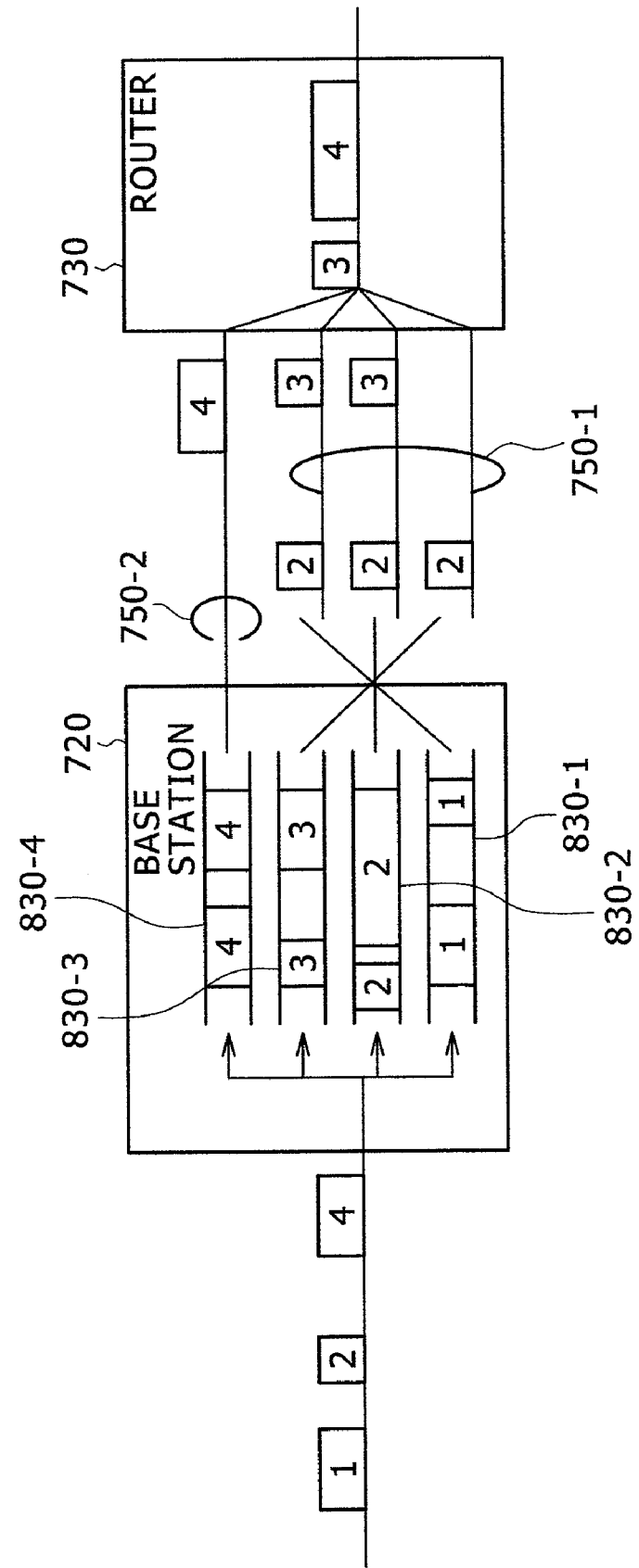
FIG. 10 illustrates how multilink-encapsulated packets are transmitted to a router from a base station having received plural packets differing in the level of priority.

Transmission of multilink-encapsulated packets to a router from a base station having received plural packets differing in priority level will be described with reference to FIG. 10. Here, FIG. 10 illustrates how multilink-encapsulated packets are transmitted to a router from a base station having received plural packets differing in the level of priority. Referring to FIG. 10, a base station 720 and a router 730 are connected by the multilink group 750-2 which transmits only VoIP packets and the multilink group 750-1 which transmits non-VoIP packets. The base station 720 has four queues 830. Here, the queue 830-4 is where packets of "4" in priority level are to be arranged. The queue 830-3 is where packets of "3" in priority level are to be arranged. The queue 830-2 is where packets of "2" in priority level are to be arranged. The queue 830-1 is where packets of "1" in priority level are to be arranged.

VoIP packets arranged in the queue 830-4 are transmitted to the router via the multilink group 750-2. Although the multilink group 750-2 as is shown in FIG. 10 has only one T1 line, plural T1 lines can be used as well.

Packets arranged in the queues 830-1 to 830-3 are transmitted to the router via the multilink group 750-2 according to the priority level.

This embodiment enables even a large size packet queued before a VoIP packet to be transmitted, without affecting the VoIP packet, by transmitting only the VoIP packet in a multilink group dedicated thereto.

The present invention can warrant the quality of VoIP packets on a mobile network.

What is claimed is:

1. A base station connected to a plurality of mobile terminals and packet transfer equipment,
wherein said base station, when data packets are received from the plurality of mobile terminals, splits the same into VoIP packets and non-VoIP packets on the basis of the priority levels of the data packets, and transmits the VoIP packets from a first set of T1 lines to which multilink PPP is applied to the packet transfer equipment and the non-VoIP packets from a second set of T1 lines to which multilink PPP is applied to the packet transfer equipment.

2. The base station according to claim 1, comprising:

a line managing unit which monitors the band used by the first set of T1 lines and reorganizes multilink groups between the first set of T1 lines and the second set of T1 lines as required.

3. Packet transfer equipment which, connected to a base station, transfers data packets received from a network to the base station, wherein said packet transfer equipment, when data packets are received from the network, splits the same into VoIP packets and non-VoIP packets on the basis of the priority levels of the data packets, and transmits the VoIP packets from a first set of T1 lines to which multilink PPP is applied to the base station and the non-VoIP packets from a second set of T1 lines to which multilink PPP is applied to the base station.

4. The packet transfer equipment according to claim 3, comprising:

a line managing unit which monitors the band used by the first set of T1 lines and reorganizes multilink groups between the first set of T1 lines and the second T1 line as required.

\* \* \* \* \*